(12) United States Patent
Felske et al.

(10) Patent No.: US 9,457,905 B2
(45) Date of Patent: Oct. 4, 2016

(54) VEHICLE SEAT COMPRISING INTEGRATED HOLDER FOR ELECTRONIC DEVICES

(71) Applicant: Airbus Operations GmbH, Hamburg (DE)

(72) Inventors: Thomas Felske, Hamburg (DE); Lars Schomacker, Hamburg (DE); Carsten Wolgast, Hamburg (DE); Gerd Dueser, Hamburg (DE); Erwin Ilias, Schwabisch Hall (DE); Peter Miehlke, Schwabisch Hall (DE); Horst Pohlenz, Schwabisch Gmund (DE); Dino Miler, Schwabisch Hall (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/751,512

(22) Filed: Jun. 26, 2015

(65) Prior Publication Data

US 2016/0009394 A1 Jan. 14, 2016

(30) Foreign Application Priority Data

Jun. 30, 2014 (DE) ........................ 10 2014 212 635

(51) Int. Cl.
| | | |
|---|---|---|
| *B64D 11/00* | (2006.01) | |
| *B64D 11/06* | (2006.01) | |
| *B64G 1/60* | (2006.01) | |
| *B60N 3/00* | (2006.01) | |

(52) U.S. Cl.
CPC ......... *B64D 11/00152* (2014.12); *B60N 3/004* (2013.01); *B64D 11/0627* (2014.12); *B64D 11/0638* (2014.12); *B64G 1/60* (2013.01)

(58) Field of Classification Search
CPC .................... B64D 11/00152; B64D 11/0638; B64D 11/0627; B60N 3/004; B64G 1/60
USPC .......................... 297/146, 188.07; 244/118.6
See application file for complete search history.

(56) References Cited

U.S. PATENT DOCUMENTS

| | | | | |
|---|---|---|---|---|
| 2,015,315 | A * | 9/1935 | McMackin ............. | B60R 15/04 |
| | | | | 297/146 |
| 2,025,393 | A * | 12/1935 | Kupfer .................. | B60N 3/004 |
| | | | | 297/146 |
| 6,592,179 | B1* | 7/2003 | Miyazaki ............. | B60N 2/4876 |
| | | | | 297/146 |
| 2012/0120626 | A1 | 5/2012 | Akaike | |
| 2013/0147240 | A1 | 6/2013 | Lee | |

(Continued)

FOREIGN PATENT DOCUMENTS

| | | |
|---|---|---|
| DE | 10 2010 006 261 A1 | 8/2011 |
| DE | 20 2012 100 251 U1 | 2/2012 |

(Continued)

OTHER PUBLICATIONS

German Search Report for Application No. 10 2014 212 635.5 dated Feb. 5, 2015.

*Primary Examiner* — Milton Nelson, Jr.
(74) *Attorney, Agent, or Firm* — Jenkins, Wilson, Taylor & Hunt, P.A.

(57) ABSTRACT

A vehicle seat includes a backrest, a recess made in the backrest, a holder base fitted to a rear wall of the recess, an upper holder clip which is movably and resiliently mounted in a clip rail extending vertically from top to bottom in the holder base, and a fold-out tray which can be folded out from the recess by two folding hinges which are fitted to the inner side walls of the recess inside the recess.

10 Claims, 2 Drawing Sheets

(56) References Cited

U.S. PATENT DOCUMENTS

2014/0015289 A1\* 1/2014 Fan .................. B60N 3/004
                                        297/188.05
2015/0108798 A1\* 4/2015 Boyer, Jr. .......... B64D 11/0638
                                        297/163

FOREIGN PATENT DOCUMENTS

| DE | 10 2012 210 754 A1 | | 1/2014 | |
|---|---|---|---|---|
| DE | 10 2012 217 802 A1 | | 4/2014 | |
| DE | 10 2012 112 942 A1 | | 6/2014 | |
| EP | 2746158 A1 | \* | 6/2014 | ............. B64D 11/06 |
| FR | 2989651 A1 | \* | 10/2013 | ............. B60N 3/004 |
| FR | 3014781 A1 | \* | 6/2015 | ............. B60N 3/004 |
| GB | 2029346 A | \* | 3/1980 | ............. A47B 31/06 |
| WO | WO 2014/001155 A1 | | 1/2014 | |
| WO | WO 2014/049072 A1 | | 4/2014 | |
| WO | WO 2014/096295 A1 | | 6/2014 | |

\* cited by examiner

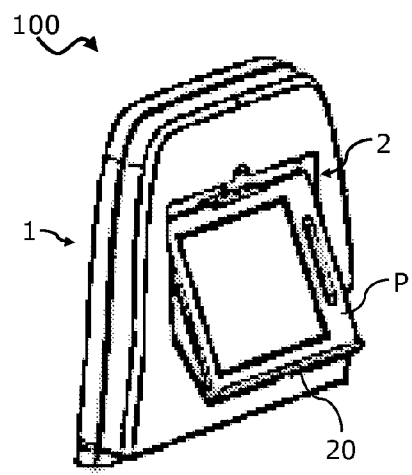
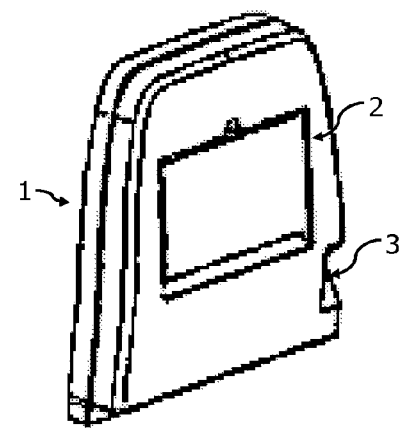
FIG. 4A
FIG. 4B
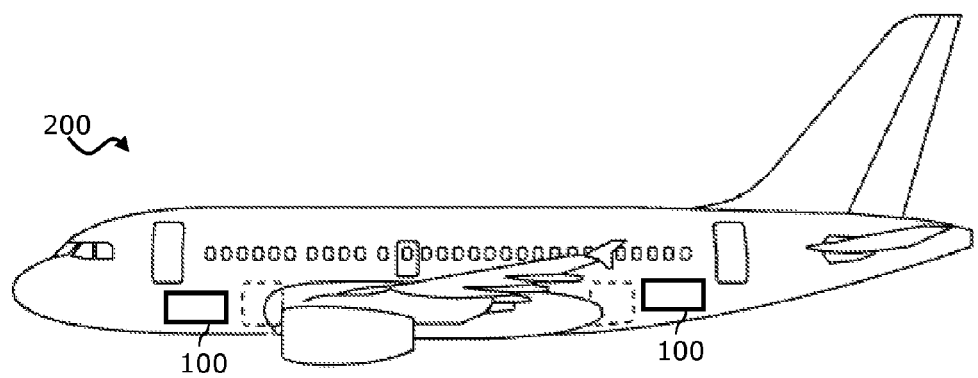
FIG. 5

VEHICLE SEAT COMPRISING INTEGRATED HOLDER FOR ELECTRONIC DEVICES

CROSS-REFERENCE TO RELATED APPLICATION

This application claims priority to DE 10 2014 212 635.5 filed Jun. 30, 2014, the entire disclosure of which is incorporated by reference herein.

TECHNICAL FIELD

The present disclosure relates to a vehicle seat comprising an integrated holder for electronic devices, in particular a seat in an aircraft or spacecraft. Although applicable to any seat in vehicles or for vehicles, the present disclosure and the problem addressed thereby will be explained in more detail with reference to an aircraft.

BACKGROUND

Personal electronic devices are becoming ever more common, and the devices are also often being used on board flights. The wide variety of communication interfaces which modern electronic devices have means it makes sense to also allow passengers with these types of devices access to the aircraft networks and therefore access to electronic control functions of certain parts of the aircraft equipment (e.g. entertainment media), even when on board an aircraft. Furthermore, it may contribute to passenger comfort if personal electronic devices are temporarily placed in a holder in order to make both operating and viewing graphic display apparatuses more convenient.

Especially during important flight phases, such as during taxiing and during take-off and landing of an aircraft, electronic devices which the passengers have brought with them and those provided by the airline must be secured and temporarily deactivated if necessary.

DE 10 2010 006 261 A1 discloses a means for attaching a tablet computer to the back of a vehicle seat, comprising an attachment apparatus and a support element connected to the attachment apparatus.

DE 10 2012 210 754 A1 discloses an aircraft seat comprising a visual playback apparatus which is integrated in the surface of the seat and is releasably coupled, by a holder, to a base which is rigidly connected to the seat.

DE 10 2012 217 802 A1 discloses a system for attaching passenger devices to a portable retaining adapter in an aircraft.

US 2013/0147240 A1 discloses an aircraft seat comprising a shelf which can be folded out from the backrest and on which a tablet computer can be placed and propped against the backrest.

However, there is a need for solutions for attaching personal electronic devices to vehicle seats, which allow the personal electronic devices to be retained in a flexibly adjustable and reliable manner which ensures the safety of the passengers.

SUMMARY

According to the disclosure herein, a first aspect of the disclosure herein relates to a vehicle seat comprising a backrest, a recess made in the backrest, a holder base fitted to a rear wall of the recess, an upper holder clip which is movably and resiliently mounted in a clip rail extending vertically from top to bottom in the holder base, and a fold-out tray which can be folded out from the recess by two folding hinges which are fitted to the inner side walls of the recess inside the recess.

A second aspect of the disclosure herein relates to an aircraft or spacecraft comprising at least one vehicle seat according to the first aspect of the disclosure herein.

The present disclosure is based on the concept of providing a holder, intended for personal electronic devices belonging to passengers of a vehicle, in the backrest of a vehicle seat, which holder is equipped with resiliently mounted clamping elements which can be moved in the vertical position. As a result, personal electronic devices of different sizes can likewise be fixed in the holder and used. The holder allows the personal electronic device to be retained in a suitable position for convenient and easily accessible operation by the passenger.

The holder can be folded up into the backrest of the vehicle seat so that in certain operating situations of the vehicle the personal electronic device can be stowed securely in the backrest. When folded up, the holder and the backrest form an almost flat and uniform surface, therefore fulfilling aircraft safety regulations during critical aircraft operating phases. Since personal electronic devices of different sizes can be retained, passengers can always bring their own personal electronic devices with them in the aircraft, and therefore no additional weight needs to be added by display devices which are pre-installed in the vehicle.

According to one embodiment of the vehicle seat, the fold-out tray can have a tray holder groove, which is formed above the lower edge of the fold-out tray either completely or in part, and is generally U-shaped.

According to an additional embodiment of the vehicle seat, the tray holder groove can be U-shaped.

According to an additional embodiment of the vehicle seat, the tray holder groove can comprise one or more connection through-openings.

According to an additional embodiment of the vehicle seat, the recess can be a hollow having a rectangular or square cross-sectional area and a predetermined depth in the backrest.

According to an additional embodiment of the vehicle seat, the upper holder clip can be a clamp having a U-shaped latching hook which protrudes forwards from the holder base.

In this case, according to a specific embodiment of the vehicle seat, the holder base can further comprise a lower holder clip having a U-shaped latching hook which protrudes forwards from the holder base. In this case, the lower holder clip can be arranged, in one variant, so as to be a horizontal mirror image of the latching hook of the upper holder clip.

According to an additional embodiment of the vehicle seat, the vehicle seat can further comprise a holder lock which is arranged on the upper edge of the recess and is designed to lock the fold-out tray in a folded-up state in the recess.

The above embodiments and developments can be combined with one another in any desired, expedient manner. Further possible embodiments, developments and implementations of the disclosure herein also include combinations, which are not explicitly mentioned, of features of the disclosure herein described previously or in the following with reference to the embodiments. In this case, in particular, a person skilled in the art will also add individual aspects as improvements or additions to the respective basic form of the present disclosure.

BRIEF DESCRIPTION OF THE DRAWINGS

In the following, the present disclosure will be described in more detail with reference to the embodiments shown in the schematic figures, in which:

FIG. 5 is a schematic illustration of an aircraft comprising one or more aircraft seats according to an additional embodiment.

Figure 1:
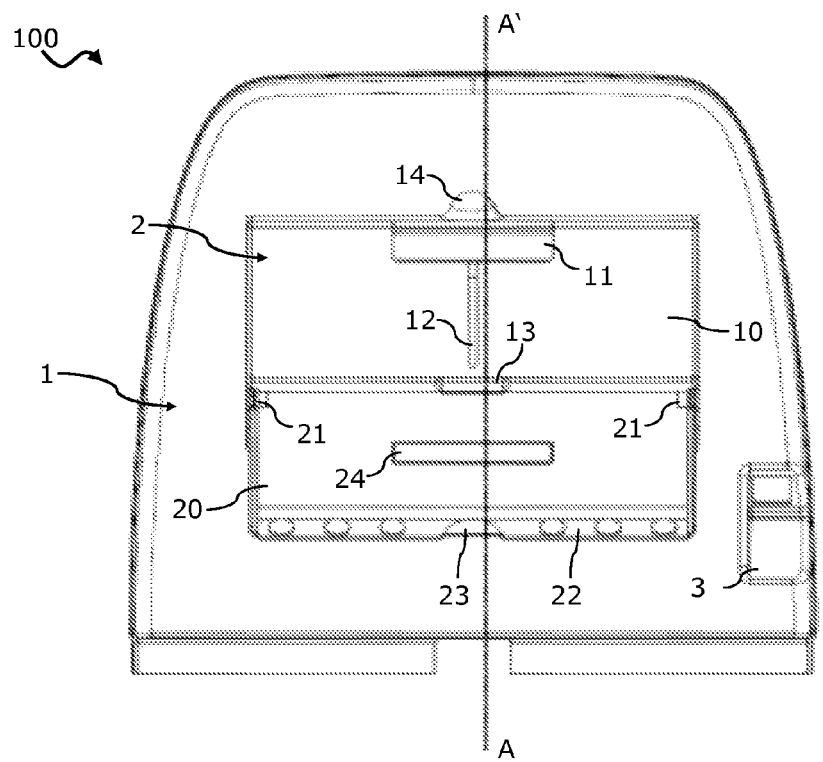
FIG. 1 is a schematic front view of a backrest of a vehicle seat according to one embodiment.

The accompanying figures are intended to provide further understanding of the embodiments of the disclosure herein. They illustrate embodiments and, in conjunction with the description, serve to explain principles and concepts relating to the disclosure herein. Other embodiments and many of the mentioned advantages are disclosed with reference to the drawings. The parts in the drawings are not necessarily shown true-to-scale in relation to one another.

In the figures of the drawings, identical, functionally identical and operationally identical parts, features and components are provided with the same reference numerals in each case, unless indicated otherwise.

DETAILED DESCRIPTION

Personal electronic devices (PEDs) in the context of the present disclosure include all electronic approaches or means which can be used for the purpose of entertainment, communication and/or office work. For example, PEDs can include all types of consumer devices, such as laptops, mobile phones, smartphones, handheld devices, palmtop PCs, tablet PCs, GPS devices, navigation devices, audio equipment such as MP3 players, portable DVD/Bluray® players or digital cameras.

Seating areas or seats in the context of the present disclosure include all the means which are assigned to an aircraft passenger for their time in the aircraft and are provided for personal use by the passenger at least during the duration of a flight. For example, seating areas or seats can include standard aircraft seats, but also reclining chairs, armchairs, beds, 1st class suites or similar passenger furniture.

FIG. 1 shows a schematic front view of a vehicle seat 100 comprising a backrest 1. The schematic cross-sectional views of the vehicle seat 100 in FIG. 1 are shown in this case in FIGS. 2 and 3 along the sectional line A-A' indicated in FIG. 1.

In this case, the backrest 1 can have a recess 2 in the rear side thereof, for example at approximately the same height as the headrest or of the back-supporting region of the backrest. The recess 2 can, in this case, be a hollow having for example a rectangular or square cross-sectional area and a predetermined depth in the backrest 1. A holder base 10 is arranged in the recess or hollow 2 and has an upper holder clip 11. The holder base 10 can in this case be a plate made of plastics material or metal, the superficial extent of which substantially corresponds to the cross-sectional area of the recess 2, and which is rigidly connected to the backrest 1 of the seat 100 on the rear wall of the recess 2.

In this case, the upper holder clip 11 can for example be a clamp made of plastics material or metal, having a U-shaped latching hook which protrudes forwards from the holder base 10. The latching hook of the upper holder clip 11 can be used to securely hold an edge of a flat object, for example a tablet PC, smartphone, phablet, e-book reading device or other personal electronic devices (PED) P. For this purpose, the upper holder clip 11 can be movably guided in a clip rail 12, extending vertically from top to bottom in the holder base 10, so that the height of the upper holder clip 11 can be adjusted with regard to its position relative to the recess 2. The upper holder clip 11 can for example be resiliently mounted in the clip rail 12 so that upward deflection of the upper holder clip 11 in the clip rail 12 produces, as a result of the resilient mounting of the upper holder, a restoring force which clamps the retained personal electronic device P in an interlocking manner. The resilient mounting on the one hand ensures that the personal electronic device P can be removed from the holder clip 11 again; on the other hand, the resilient mounting is advantageous in that the adjustment height of the upper holder clip 11 can be variably adjusted to match the dimensions of a personal electronic device P to be retained.

A lower holder clip 13 is arranged on the holder base 10 underneath the upper holder clip 11 in relation to the vehicle seat 100. The lower holder clip 13 can likewise be made of plastics material or metal, and has a U-shaped latching hook which protrudes forwards from the holder base 10. The latching hook of the lower holder clip 13 is arranged in this case so as to be a horizontal mirror image of the latching hook of the upper holder clip 11, so that the lower holder clip 13 can hold a first edge of a personal electronic device P and the upper holder clip 11 can hold a second edge of the personal electronic device P, which runs in parallel with and opposite to the first edge, at the same time. As a result, a personal electronic device can be retained, in the recess 2, between the holder clips 11 and 13 of the holder base 10 so as to be plane-parallel with the extent surface of the holder base 10.

Furthermore the vehicle seat 100 comprises a fold-out tray 20 which can also be produced from plastics material or metal, for example. The fold-out tray 20 can be folded out from the recess 2 by two folding hinges 21, which are fitted to the inner side walls of the recess 2 inside the recess 2. This is shown in FIG. 3 by the arrow having the reference sign R. In this case, the folding movement R is such that, when folded up, the fold-out tray 20 has a lower edge which is flush with the upper edge of the recess 2. In each of FIGS. 1, 2 and 3, the fold-out tray 20 is shown in the folded-out state, in which the extent surface of the fold-out tray 20 protrudes from the vehicle seat 100 at an angle to the surface of the backrest 1.

The lower edge of the fold-out tray 20 is equipped with a tray holder groove 22 which is designed to receive an edge of a PED P in a substantially interlocking manner. For this purpose, the tray holder groove 22 can be formed either completely or in part above the lower edge of the fold-out tray 20 and can be generally U-shaped. At suitable points, for example in the centre of the fold-out tray 20, the tray holder groove 22 can have one or more connection passages or connection through-openings 23, through which connection cables or power supply cables can be connected to electrical connections of a PED P retained in the tray holder groove 22. This offers the advantage that every possible way of connecting the PED P to cables or other components, such as USB sticks, is still possible, even if the PED P is positioned in the holder of the vehicle seat 100.

When folded up, the fold-out tray 20 can be locked by a holder lock 14 on the upper edge of the recess 2, for example by a snap element or a rotary lever. The fold-out tray 20 can also have a clip receptacle 24 in the centre of the surface, which receptacle is designed as a hollow and is substantially the same size as the upper holder clip 11. As a result, when the fold-out tray 20 is folded up, the upper holder clip 11 can be held in the clip receptacle 24 of the fold-out tray 20 so as to be flush therewith. This allows the surface of the underside of the fold-out tray 20 to be virtually flush, around the recess 2, with the surface of the backrest 1 when the fold-out tray 20 is folded up.

By folding up the fold-out tray 20 for a vehicle seat 100 in an aircraft, head injury criteria (HIC) can be complied with during critical flight phases such as taxiing, take-off and landing. The PED P can, in this case, be left in the holder of the vehicle seat 100 and is securely temporarily stored in the hollow space between the folded-up fold-out tray 20 and the holder base 10.

Figure 2:
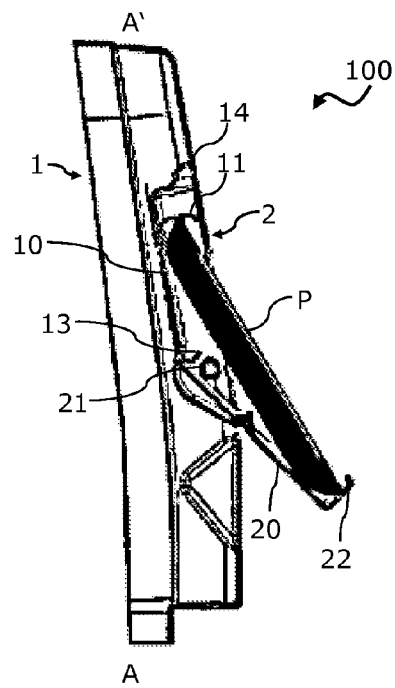
FIG. 2 is a schematic cross-sectional view of the backrest of the vehicle seat in FIG. 1 according to an additional embodiment.
Figure 3:
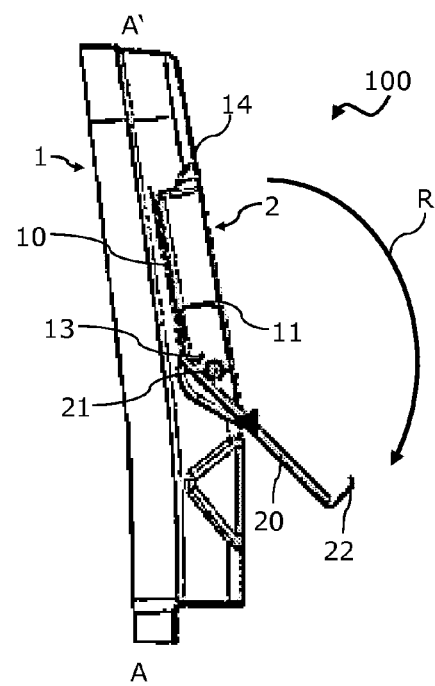
FIG. 3 is a schematic cross-sectional view of the backrest of the vehicle seat in FIG. 1 according to an additional embodiment, FIGS. 4A/4B are schematic perspective views of the backrest of the vehicle seat in FIG. 1 according to an additional embodiment.

As shown in FIG. 2, relatively large PEDs P, such as tablet PCs or notebooks, can be resiliently clamped between the upper holder clip 11 and the tray holder groove 22. As a result, an inclination angle of the display apparatus of the PED P relative to the backrest 1 is advantageously created, allowing for easy reading of graphic displays on the display apparatus of the PED P by a passenger sitting behind the backrest 1. The lower holder clip 13 is positioned at a shorter distance from the upper holder clip 11 than the tray holder groove 22, so that smaller PEDs such as smartphones or phablets can be resiliently clamped between the upper holder clip 11 and the lower holder clip 13.

A USB cable, an HDMI cable or a similar connecting cable, for example, can be used to connect a USB port, HDMI port or other port on the PED P to a USB port, HDMI port or other port on the vehicle seat 100, for example to a central connecting point 3 for electrical connections which are connected to a power or data supply of the vehicle by the vehicle seat. Of course other options for connecting to the PED P can also be used, for example a Bluetooth® connection, a FireWire connection, a wireless mobile connection, a mobile phone network connection, a serial interface connection or other suitable communication paths.

FIGS. 4A and 4B illustrates views of a vehicle seat 100 according to FIGS. 1 to 3: in this case, FIG. 4A shows the fold-out tray 20 when it is unfolded, together with a tablet PC P retained therein. FIG. 4B shows the fold-out tray 20 when it is folded up, wherein the tablet PC P is optionally stowed away in the recess 2 so as to be covered by the fold-out tray 20.

FIG. 5 is a schematic illustration of an aircraft 200 having at least one aircraft seat, for example having a vehicle seat 100 as described in conjunction with FIGS. 1 to 4B. The aircraft 200 can have a wireless network, such as a Wi-Fi network, a WLAN network, a UMTS network, a GSM network, a WiMAX network, a ZigBee network or another suitable network for wireless data communication. Via the wireless network of the aircraft 200, passengers having PEDs P like that shown by way of example in FIG. 2 can use wireless communication options with selected or unlocked cabin systems of the aircraft 200 or external networks such as mobile phone networks or the Internet.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A vehicle seat comprising:
   a backrest;
   a recess made in the backrest;
   a holder base fitted to a rear wall of the recess;
   an upper holder clip which is movably and resiliently mounted in a clip rail extending vertically from top to bottom in the holder base; and
   a fold-out tray which can be folded out from the recess by two folding hinges which are fitted to the inner side walls of the recess inside the recess.

2. The vehicle seat according to claim 1, wherein the recess is a hollow having a rectangular or square cross-sectional area and a predetermined depth in the backrest.

3. The vehicle seat according to claim 1, further comprising:
   a holder lock which is arranged on an upper edge of the recess and is designed to lock the fold-out tray in a folded-up state in the recess.

4. The vehicle seat according to claim 1, wherein the upper holder clip is a clamp having a U-shaped latching hook which protrudes forwards from the holder base.

5. The vehicle seat according to claim 4, wherein the holder base further comprises a lower holder clip having a U-shaped latching hook which protrudes forwards from the holder base.

6. The vehicle seat according to claim 5, wherein the lower holder clip is arranged so as to be a horizontal mirror image of the latching hook of the upper holder clip.

7. The vehicle seat according to claim 1, wherein the fold-out tray comprises a tray holder groove which is formed above a lower edge of the fold-out tray, either completely or in part, and is generally U-shaped.

8. The vehicle seat according to claim 7, wherein the tray holder groove is U-shaped.

9. The vehicle seat according to claim 7, wherein the tray holder groove comprises one or more connection through-openings.

10. An aircraft or spacecraft comprising at least one vehicle seat, the at least one vehicle seat comprising:
    a backrest;
    a recess made in the backrest;
    a holder base fitted to a rear wall of the recess;
    an upper holder clip which is movably and resiliently mounted in a clip rail extending vertically from top to bottom in the holder base; and
    a fold-out tray which can be folded out from the recess by two folding hinges which are fitted to the inner side walls of the recess inside the recess.

* * * * *